United States Patent
Lin et al.

(10) Patent No.: US 12,382,515 B2
(45) Date of Patent: Aug. 5, 2025

(54) METHOD AND APPARATUS FOR REPORTING RANDOM ACCESS PROCESS

(71) Applicant: GUANGDONG OPPO MOBILE TELECOMMUNICATIONS CORP., LTD., Dongguan (CN)

(72) Inventors: Xue Lin, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 344 days.

(21) Appl. No.: 17/966,076

(22) Filed: Oct. 14, 2022

(65) Prior Publication Data
US 2023/0029520 A1    Feb. 2, 2023

Related U.S. Application Data

(63) Continuation of application No. PCT/CN2020/090755, filed on May 18, 2020.

(51) Int. Cl.
*H04W 74/0833* (2024.01)

(52) U.S. Cl.
CPC ............... *H04W 74/0858* (2013.01)

(58) Field of Classification Search
CPC ........... H04W 74/002; H04W 74/0833; H04W 74/0836; H04W 74/0858
See application file for complete search history.

(56) References Cited

U.S. PATENT DOCUMENTS

| 2014/0023032 A1* | 1/2014 | Kim ................ H04W 72/542 370/329 |
| 2023/0077603 A1* | 3/2023 | Qiu ................ H04W 76/20 370/329 |

FOREIGN PATENT DOCUMENTS

| CN | 110753324 A | 2/2020 |
| CN | 110800361 A | 2/2020 |
| CN | 110831227 A | 2/2020 |
| CN | 110972322 A | 4/2020 |
| CN | 111436159 A | 7/2020 |
| WO | 2020001478 A1 | 1/2020 |
| WO | 2020067975 A1 | 4/2020 |
| WO | 2021109388 A1 | 6/2021 |

OTHER PUBLICATIONS

Samsung, "Further Logged Information in NR MDT", R2-1916095, 3GPP TSG-RAN WG2 Meeting #108 Reno, USA, Nov. 18-22, 2019.
ZTE Corporation et al., "[Z152] Correction to RACH report and RLF report", R2-2002923, 3GPP TSG RAN WG2#109bis-e Electronic meeting, Apr. 20-Apr. 30, 2020.
(Continued)

*Primary Examiner* — Kashif Siddiqui
(74) *Attorney, Agent, or Firm* — BAYES PLLC

(57) ABSTRACT

Disclosed in the present application are a method and apparatus for reporting a random access procedure. The method includes: receiving a first message sent by a network device, the first message being used to indicate the terminal device to report a random access parameter list to the network device, and the random access parameter list including a two-step random access parameter list and/or a four-step random access parameter list; and reporting the random access parameter list to the network device according to the first message.

20 Claims, 6 Drawing Sheets

(56) References Cited

OTHER PUBLICATIONS

Ericsson (feature summary rapporteur), "Feature summary for SON contributions in AI 6.12.4", R2-2002025, 3GPP TSG-RAN WG2 #109-e Electronic meeting, Feb. 24-Mar. 6, 2020.

CATT, "Leftover Issues for RACH Report Optimization", R2-1914499, 3GPP TSG-RAN WG2 Meeting #108 Reno, USA, Nov. 18-22, 2019.

Nokia et al., "On the RACH Report and its reporting procedure", R2-1915619, 3GPP TSG-RAN WG2 Meeting #108 Reno, USA, Nov. 18-22, 2019.

ZTE Corporation et al., "Further considerations on RACH optimization", R2-1915419, 3GPP TSG RAN WG2 Meeting #108 Reno, USA, Nov. 18- Nov. 22, 2019.

International Search Report issued in International application No. PCT/CN2020/090755, mailed Feb. 23, 2021.

Written Opinion of the International Searching Authority issued in International application No. PCT/CN2020/090755, mailed Feb. 23, 2021.

Extended European Search Report issued in corresponding European application No. 20936940.4, mailed Mar. 30, 2023.

Samsung, "On Reporting Random Access-related Information", R2-1909210, 3GPP TSG-RAN WG2 Meeting #107 Prague, Czech Republic, Aug. 26-30, 2019.

First Office Action issued in corresponding European application No. 20936940.4, mailed Dec. 7, 2023.

Notice of priority examination of patent application issued in corresponding Chinese Application No. 202311467549.7, dated Oct. 23, 2024, 4 pages.

First Office Opinion Notice issued in corresponding Chinese Application No. 202311467549.7, dated Nov. 15, 2024, 20 pages.

Second Office Action issued in corresponding Chinese Application No. 202311467549.7, mailed on Jan. 27, 2025, 19 pages.

* cited by examiner

METHOD AND APPARATUS FOR REPORTING RANDOM ACCESS PROCESS

CROSS-REFERENCE TO RELATED APPLICATION

This application is a continuation of International Application No. PCT/CN2020/090755, filed on May 18, 2020, which is incorporated herein by reference in its entirety.

TECHNICAL FIELD

Embodiments of the present disclosure generally relate to the communication technical field, and more particularly, to a method and device for reporting a random access procedure.

BACKGROUND

The two-step random access procedure is a new implementation of the random access procedure introduced in Rel-16 (Release 16). The two-step random access procedure and the four-step random access procedure are quite different in terms of resource configuration and access process.

The existing methods and contents of random access reporting are designed based on four-step random access, and thus the existing process of reporting random access cannot reflect the two-step random access procedure. Therefore, the parameter configuration of the two-step random access procedure cannot be adaptively optimized according to the related parameters for the two-step random access procedure, and there is a technical problem that the optimization for parameter configuration of the two-step random access procedure is poor.

SUMMARY

Embodiments of the present disclosure provide methods and devices for reporting a parameter for a two-step random access procedure for solving the above technical problem.

According to a first aspect, an example embodiment of the present disclosure provides a method for reporting a random access procedure. The method is applied in a terminal device. The method includes:

receiving a first message sent by a network device, wherein the first message is used to indicate the terminal device to report a random access parameter list to the network device, and the random access parameter list includes a two-step random access parameter list and/or a four-step random access parameter list; and reporting the random access parameter list to the network device according to the first message.

According to a second aspect, an example embodiment of the present disclosure provides a method for reporting a random access procedure. The method is applied in a network device. The method includes:

sending a first message to a terminal device, wherein the first message is used to indicate the terminal device to report a random access parameter list to the network device, and the random access parameter list includes a two-step random access parameter list and/or a four-step random access parameter list; and receiving the random access parameter list which is reported by the terminal device according to the first message.

According to a third aspect, an example embodiment of the present disclosure provides device for reporting a random access procedure. The device includes:

a receiving module configured to receive a first message sent by a network device, wherein the first message is used to indicate the terminal device to report a random access parameter list to the network device, and the random access parameter list includes a two-step random access parameter list and/or a four-step random access parameter list; and a sending module configured to report the random access parameter list to the network device according to the first message.

According to a fourth aspect, an example embodiment of the resent disclosure provides device for reporting a random access procedure. The device includes:

a sending module configured to send a first message to a terminal device, wherein the first message is used to indicate the terminal device to report a random access parameter list to the network device, and the random access parameter list includes a two-step random access parameter list and/or a four-step random access parameter list; and a receiving module configured to receive the random access parameter list which is reported by the terminal device according to the first message.

According to a fifth aspect, an example embodiment of the resent disclosure provides a terminal device including a processor and a memory, wherein the memory stores a transmission program runnable on the processor, and when the processor executes the program, the processor is caused to perform any one of the above methods for reporting a random access procedure.

According to a sixth aspect, an example embodiment of the resent disclosure provides a computer-readable storage medium having a computer program stored thereon, wherein when the computer program is executed, any one of the above methods for reporting a random access procedure is implemented.

According to a seventh aspect, an example embodiment of the resent disclosure provides a computer program product, wherein the computer program product is stored in a non-transitory computer-readable storage medium, and when the computer program is executed, any one of the above methods for reporting a random access procedure is implemented.

According to an eighth aspect, an example embodiment of the resent disclosure provides a chip, including: a processor configured to call and run a computer program from a memory, and a device installed with the chip performs any one of the above methods for reporting a random access procedure.

According to a ninth aspect, an example embodiment of the resent disclosure provides a computer program, wherein when the computer program is executed, any one of the above methods for reporting a random access procedure is implemented.

The technical solutions provided by the example embodiments of the present disclosure may have the following beneficial effects:

The first message sent by the network device is received. The first message is used to indicate the terminal device to report a random access parameter list to the network device, and the random access parameter list includes a two-step random access parameter list and/or a four-step random access parameter list. According to the first message, the random access parameter list is reported to the network device. Therefore, the terminal device reports the random access parameter list to the network device, so as to ensure that the network device can obtain the parameter list for the two-step random access.

It is to be understood that the foregoing general description and the following detailed description are exemplary only and are not intended impose limitations on the present disclosure.

BRIEF DESCRIPTION OF THE DRAWINGS

The accompanying drawings, which are incorporated in and constitute a part of this specification, illustrate example embodiments consistent with the present disclosure and together with the description serve to explain the principles of the present disclosure.

DETAILED DESCRIPTION

Figure 1:
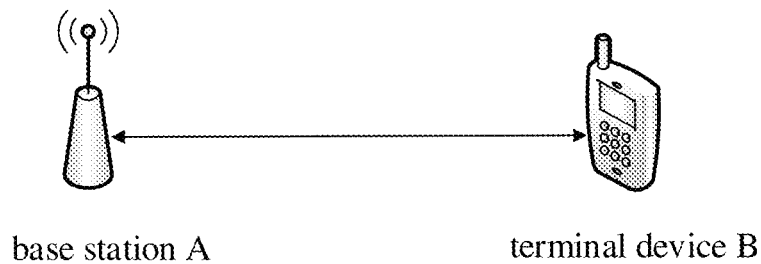
FIG. 1 is a network architecture diagram of a communication system to which example embodiments of the present disclosure may be applied.

Example embodiments will be described below in detail and examples of the embodiments are illustrated in the accompanying drawings. Where the following description refers to the drawings, the same numerals in different drawings refer to the same or similar elements unless otherwise indicated. The implementations in the following exemplary detailed descriptions are not intended to represent all implementations consistent with the implementations of the present disclosure. Rather, they are merely examples of methods and apparatus consistent with some aspects of the present disclosure as defined in the appended claims. Based on the example embodiments in the present disclosure, all other example embodiments obtained by those skilled in the art without creative efforts shall fall within the protection scope of the present disclosure.

In the system architecture, an example communication system may be a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a New Radio (NR) system, an evolution system of NR system, a LTE-based access to unlicensed spectrum (LTE-U) system, a New Radio based access to unlicensed spectrum (NR-U), a Universal Mobile Telecommunication System (UMTS), a Worldwide Interoperability for Microwave Access (WiMAX) communication systems, a Wireless Local Area Networks (WLAN), Wireless Fidelity (WiFi), next-generation communication systems or other communication systems.

The example communication system specifically includes a network device and a terminal. When the terminal accesses a mobile communication network provided by the network device, the terminal and the network device can communicate and be connected with each other through a wireless link, and the communication connection mode may be a single connection mode or a dual connection mode or a multi-connection mode. When the communication connection mode is the single connection mode, the network device may be an LTE base station or an NR base station (also known as a gNB base station). When the communication mode is the dual connection mode, it can be implemented by the carrier aggregation (CA) technology, or implemented by multiple network devices. The terminals involved in the example embodiments of the present disclosure may include various handheld devices with wireless communication functions, vehicle-mounted devices, wearable devices, computing devices or other processing devices connected to wireless modems, as well as various forms of User Equipment (UE), Mobile Station (MS), terminal device and so on. For the convenience of description, the devices mentioned above are collectively referred to as terminal devices.

Additionally, the terms "system" and "network" are often used interchangeably herein. The term "and/or" herein is only an association relationship to describe the associated objects, indicating that there can be three kinds of relationships, for example, A and/or B can mean three situations: A alone, B alone, and A and B together. In addition, the character "/" herein generally indicates that the related objects before or after "/" are in an "or" relationship.

It should be understood that, in the example implementations of the present disclosure, "B corresponding to A" means that B is associated with A, and B may be determined according to A. However, it should also be understood that determining B based on A does not mean determining B based only on A, but also determining B based on A and/or other information.

FIG. 1 is a system architecture of a communication system to which the following example embodiments of the present disclosure may be applied. The system architecture includes: a base station A and a terminal device B.

NR (new radio) Rel-16 Self-Organizing Network (SON) can optimize network parameter configuration according to information reported by the terminal device B. The base station A obtains the terminal device information through the information reporting procedure of the terminal device B.

The base station A sends a UEInformationRequest (terminal device information request) message to the terminal device B in a connected state whose security information is successfully activated. The UEInformationRequest message contains the information type that the base station A needs the terminal device B to report. When the value corresponding to each parameter field is "true", it means that the base station A needs the terminal device B to report the information corresponding to the parameter field. For example, connEstFailReportReq (connection failure report request) indicates whether the terminal device B needs to report the connection failure related information; logMeasReportReq (logged measurement report request) indicates whether the terminal device B needs to report logged measurement related information; mobilityHistoryReportReq (mobility history report request) indicates whether the terminal device B needs to report mobility history information; ra-ReportReq (random access report request) indicates whether the terminal device B needs to report information related to the random access procedure; rlf-ReportReq (request for radio link failure report) indicates whether the terminal device B needs to report information about radio link failure.

The terminal device B feeds back the recorded information to the base station A via a UEInformationResponse (terminal device information response) message in response to the UEInformationRequest initiated by the base station A.

The terminal device B may record each random access attempt information in perRAInfoList (each random access information list) in temporal order for each random access attempt. The recorded information includes: the selected SSB (Synchronization Signal Block)/CSI-RS (Channel Status Indicator Reference Signal) index, downlink beam quality corresponding to the selected SSB/CSI-RS, and contention detection. The downlink beam quality indicates through a Boolean value whether the measurement result corresponding to the selected SSB/CSI-RS is higher than a threshold configured by the network side. The contention detection indicates through a Boolean value whether other user's CRID (Contention Resolution Identity) is detected in received Msg4 (the fourth message).

The two-step random access (2-step Random Access Channel) procedure is a new feature introduced by NR (new radio) Rel-16, which aims to reduce delay and signaling overhead in the four-step random access (4-step Random Access Channel) procedure.

In the two-step random access procedure, MsgA (message A) contains the preamble transmitted on PRACH (Physical Random Access Channel) and the load information (Msg3, the third message) transmitted on the PUSCH (Physical Uplink Shared Channel). After the MsgA is transmitted, the terminal device B monitors the response from the base station A in a configured window. If the terminal device B receives an indication of successful contention resolution sent by the base station A, the terminal device B ends the random access procedure; if a fallback indication is received in MsgB (message B), terminal device B performs Msg3 transmission and monitors the contention resolution result. If the contention resolution fails after Msg3 transmission, the terminal device B continues to try transmission of MsgA. In addition, the base station A can configure the maximum number 'N' of two-step random access attempts for the terminal device B. When terminal device B has tried 'N' two-step random access and still fails to access, the terminal device B can switch to the four-step random access procedure to continue access attempt.

After MsgA is sent, there may be the following situations for the reception on the terminal device B side:

1. Within the receiving window, no response from the base station side is received.

2. Within the receiving window, a fallbackRAR (fallback random access response) sent by the base station A is received, and the terminal device B falls back to the transmission of msg3.

2.1. After Msg3 is transmitted, no response from the base station A is received within the receiving window.

2.2. After Msg3 is transmitted, Msg4 is received within the receiving window, and the contention resolution is determined to fail according to CRID.

2.3. After Msg3 is transmitted, Msg4 is received within the receiving window, and the contention resolution is determined to succeed according to CRID.

3. Within the receiving window, a successRAR (successful random access response) sent by the base station A is received, and the terminal device B determines that the contention resolution is successful according to CRID.

4. Within the receiving window, a successRAR sent by the base station A is received, and the terminal device B determines that the contention resolution failed according to CRID.

The existing methods and contents of random access reporting are designed based on four-step random access, and thus the existing process of reporting random access cannot reflect the two-step random access procedure. Therefore, the parameter configuration of the two-step random access procedure cannot be adaptively optimized according to the related parameters for the two-step random access procedure, and there is a technical problem that the optimization for parameter configuration of the two-step random access procedure is poor.

How to obtain relevant parameters for the two-step random access procedure will be described in the following example embodiments of the present disclosure, so as to ensure that the parameter configuration of the two-step random access procedure can be adaptively optimized according to the relevant parameters for the two-step random access procedure.

Figure 2:
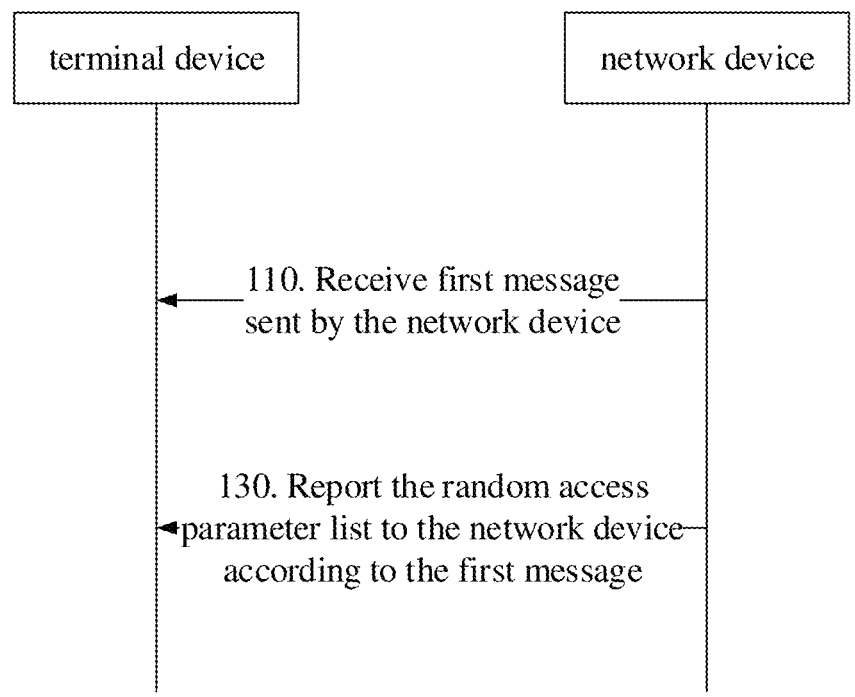
FIG. 2 is a flowchart of a method for reporting a random access procedure according to an example embodiment 1 of the present disclosure.

FIG. 2 is a flowchart of a method for reporting a random access procedure according to an example embodiment 1 of the present disclosure. The method includes the following steps:

In step 110, a terminal device receives a first message sent by a network device.

The first message is used to indicate the terminal device to report a random access parameter list to the network device, and the random access parameter list includes a two-step random access parameter list and/or a four-step random access parameter list.

In step 130, the terminal device reports the random access parameter list to the network device according to the first message.

According to some embodiments, the random access parameter list includes a random access procedure parameter for at least one successfully completed random access procedure, and the random access procedure parameter includes:

a random access resource parameter, and/or a collision detection and fallback indication parameter, and/or a random access type switching parameter.

Figure 3:
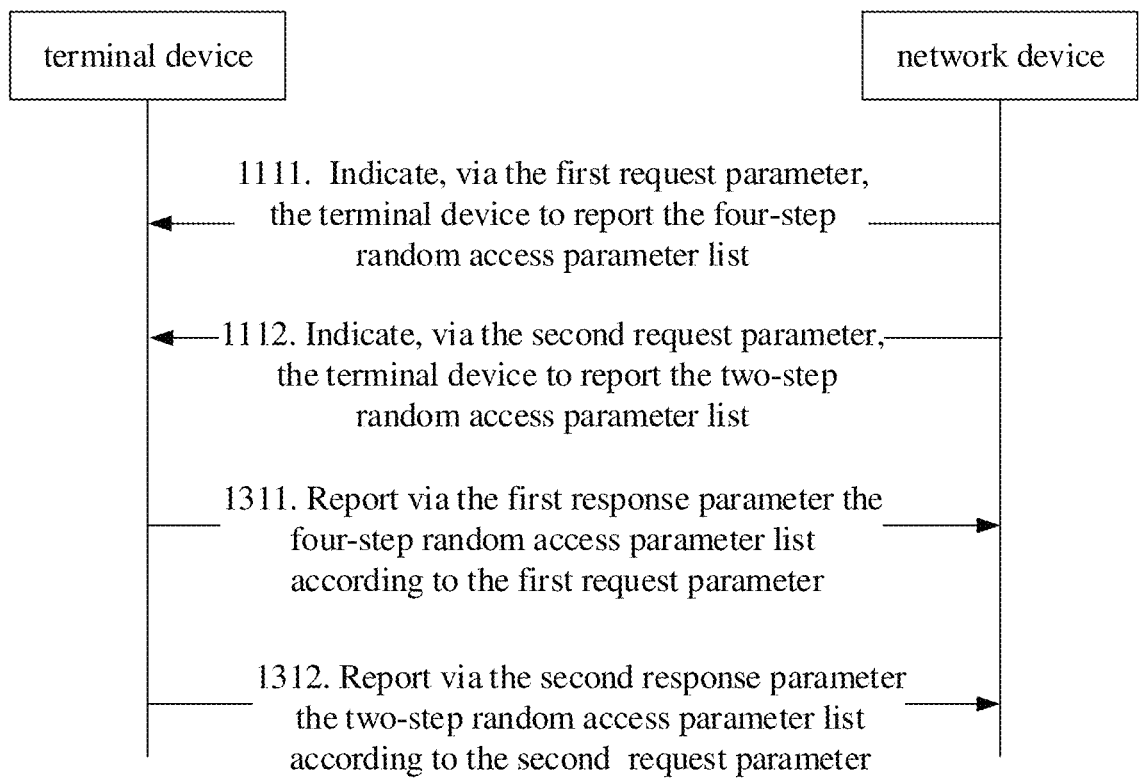
FIG. 3 is an interaction diagram of a method for reporting a random access procedure according to an example embodiment 1 of the present disclosure.

Regarding the signaling structure of the first message, a request parameter and a response parameter may be introduced separately for different random access types. Specifically, the following options are included:

Method 1:

FIG. 3 is an interaction diagram of a method for reporting a random access procedure according to an example embodiment 1 of the present disclosure. Optionally, the first message includes: a first request parameter and/or a second request parameter.

In step 1111, the network device indicates, via the first request parameter, the terminal device to report the four-step random access parameter list.

In step 1112, the network device indicates, via the second request parameter, the terminal device to report the two-step random access parameter list. Correspondingly, the terminal device sends the first response parameter and the second response parameter.

Step 130 may include the following steps:

In step 1311, the terminal device reports via the first response parameter the four-step random access parameter list to the network device according to the first request parameter; and/or, In step 1312, the terminal device reports via the second response parameter the two-step random access parameter list to the network device according to the second request parameter.

The first message may be a UEInformationRequest message, and the first message may include the first request parameter and the second request parameter. The first request parameter may be ra-ReportReq. When the first request parameter is configured as true, it means that the network device indicates the terminal device to report the four-step random access procedure. At this time, if there is a four-step random access parameter list that can be reported at the terminal device side, the terminal device reports the four-step random access parameter list to the network device via a first response parameter in UEInformationResponse which is set correspondingly to the first request parameter; otherwise, the terminal device does not respond. When the second request parameter is configured to be true, it means that the network device indicates the terminal device to report the two-step random access procedure. At this time, if there is a two-step random access parameter list that can be reported at the terminal device side, the terminal device reports the reportable two-step random access parameter list to the network device via a second response parameter in UEInformationResponse which is set correspondingly to the second request parameter; otherwise, the terminal device does not respond.

Figure 4:
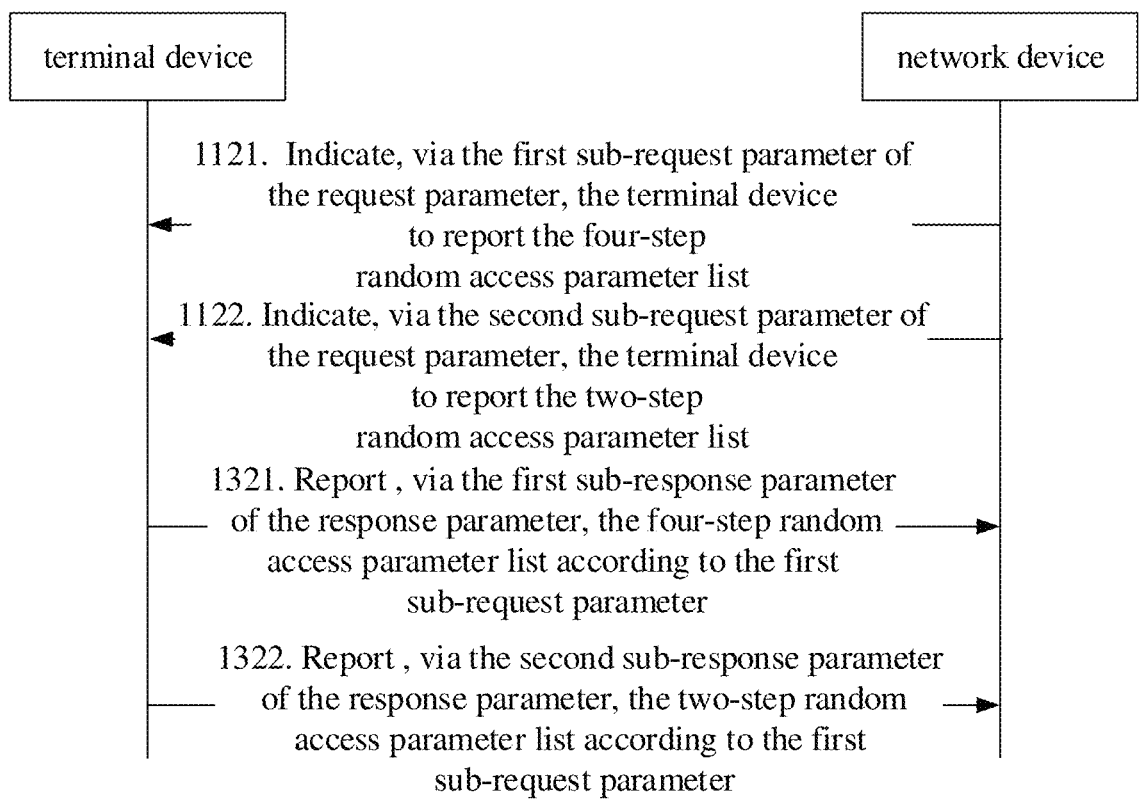
FIG. 4 is an interaction diagram of a method for reporting a random access procedure according to an example embodiment 1 of the present disclosure.

Method 2:

FIG. 4 is an interaction diagram of a method for reporting a random access procedure according to an example embodiment 1 of the present disclosure. Optionally, the first message includes a request parameter, and the request parameter includes a first sub-request parameter and a second sub-request parameter.

In step 1121, the network device indicates, via the first sub-request parameter, the terminal device to report the four-step random access parameter list.

In step 1122, the network device indicates, via the second sub-request parameter, the terminal device to report the two-step random access parameter list. Correspondingly, the terminal device sends a response parameter, and the response parameter includes a first sub-response parameter and a second sub-response parameter.

Step 130 may include the following steps:

In step 1321, the terminal device reports, via the first sub-response parameter of the response parameter, the four-step random access parameter list to the network device according to the first sub-request parameter; and/or, In step 1322, the terminal device reports, via the second sub-response parameter of the response parameter, the two-step random access parameter list to the network device according to the second sub-request parameter.

The request parameter includes the first sub-request parameter and the second sub-request parameter. A response parameter is set corresponding to the request parameter and the response parameter is used for the terminal device to report the four-step random access procedure and the two-step random access procedure. The response parameter includes the first sub-response parameter and the second sub-response parameter. When the first sub-request parameter is set to be true, if there is a reportable four-step random access parameter list at the terminal device side, the four-step random access parameter list is reported to the network device via the first sub-response parameter of the response parameter in UEInformationResponse; otherwise, the terminal device does not respond. When the second sub-request parameter is set to be true, if there is a reportable two-step random access parameter list at the terminal device side, the two-step random access parameter list is reported to the network device via the second sub-response parameter of the response parameters in the UEInformationResponse; otherwise, the terminal device does not respond.

The above Method 1 and Method 2 are only used as examples to illustrate how to optimize the signaling structure, and the implementation may be sending the random access parameter lists separately for different random access types. However, the above examples are not intended to limit the specific implementations of the present disclosure. In example implementations, the network device may initiate a report request to the terminal device in a targeted manner according to optimization requirements.

Figure 5:
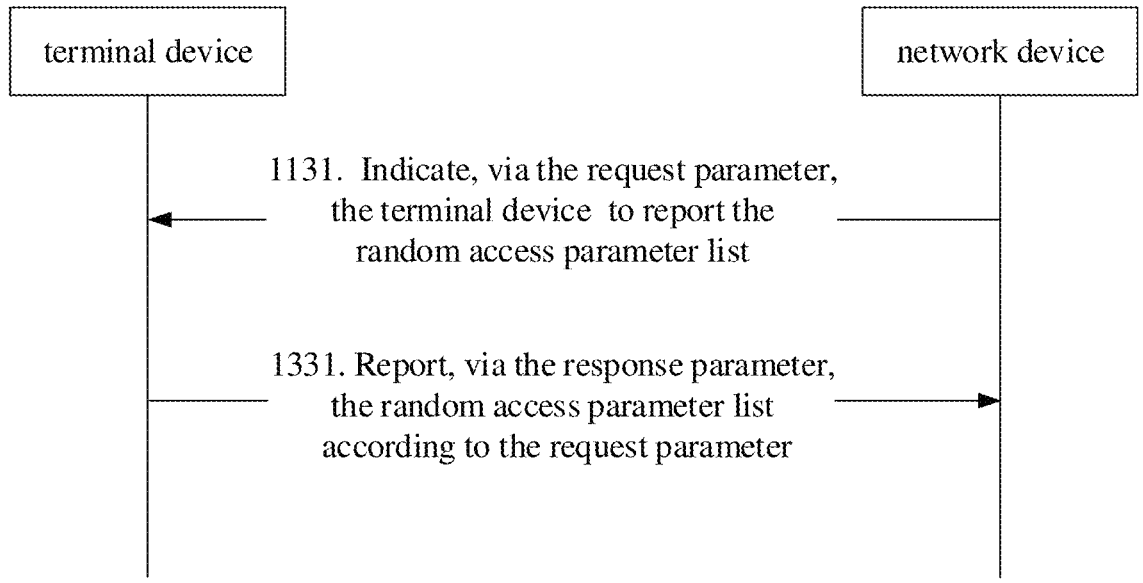
FIG. 5 is an interaction diagram of a method for reporting a random access procedure according to an example embodiment 1 of the present disclosure.

Regarding the signaling structure of the first message, it may also be possible to request the terminal device to report all the random access parameter lists that can be reported without distinguishing the types. Specifically, the following optional methods may be included:

Method 1:

FIG. 5 is an interaction diagram of a method for reporting a random access procedure according to an example embodiment 1 of the present disclosure. Optionally, the first message includes a request parameter.

In step 1131, the network device indicates via the request parameter the terminal device to report the random access parameter list, and the random access parameter list includes a two-step random access parameter list and/or a four-step random access parameter list.

Step 130 may include the following steps:

In step 1331, the terminal device reports via a response parameter the random access parameter list according to the request parameter.

The first message may include the request parameter, and the response parameter is set corresponding to the request parameter. The response parameter is used for the terminal device to report the four-step random access procedure and the two-step random access procedure. When the request parameter is set to be true, if there is a four-step random access parameter list and a two-step random access parameter list that can be reported at the terminal device side, the reportable random access parameter lists are reported to the network device via the response parameter in UEInformationResponse which is set corresponding to the request parameter; otherwise, the terminal device does not respond.

Figure 6:
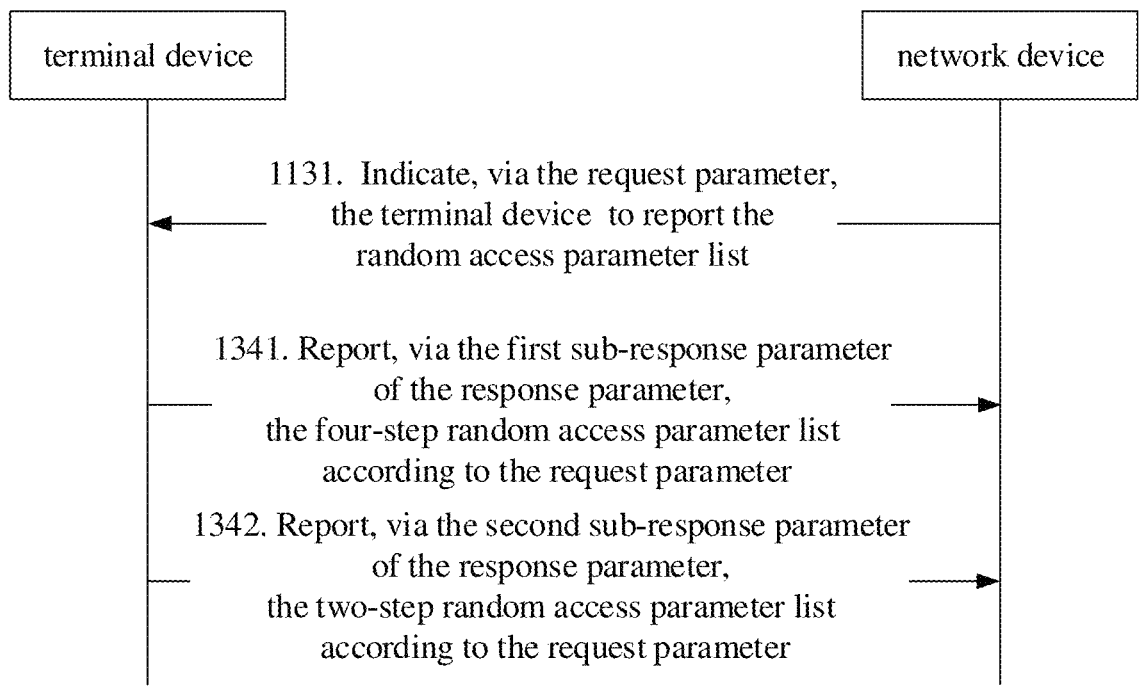
FIG. 6 is an interaction diagram of a method for reporting a random access procedure according to an example embodiment 1 of the present disclosure.

Method 2:

FIG. 6 is an interaction diagram of a method for reporting a random access procedure according to an example embodiment 1 of the present disclosure. Optionally, the first message includes a request parameter.

In step 1131, the network device indicates, via the request parameter, the terminal device to report the random access parameter list. The random access parameter list includes a two-step random access parameter list and/or a four-step random access parameter list. Correspondingly, the terminal device sends a response parameter, and the response parameter includes a first sub-response parameter and a second sub-response parameter.

Step 130 may include the following steps:

In step 1341, the terminal device reports, via the first sub-response parameter of the response parameter, the four-step random access parameter list to the network device according to the request parameter; and/or, In step 1342, the terminal device reports, via the second sub-response parameter of the response parameter, the two-step random access parameter list to the network device according to the request parameter.

The first sub-response parameter and the second sub-response parameter of the response parameter are used for the terminal device to report the four-step random access parameter list and the two-step random access parameter list, respectively. When the request parameter is set to be true, if there is a reportable four-step random access parameter list at the terminal device side, the four-step random access parameter list is reported to the network device via the first sub-response parameter of the response parameter in the UEInformationResponse; otherwise, the terminal device does not respond. If there is a two-step random access parameter list that can be reported at the terminal device side, the two-step random access parameter list is reported to the network device via the second sub-response parameter of the response parameter in UEInformationResponse; otherwise, the terminal device does not respond.

Figure 7:
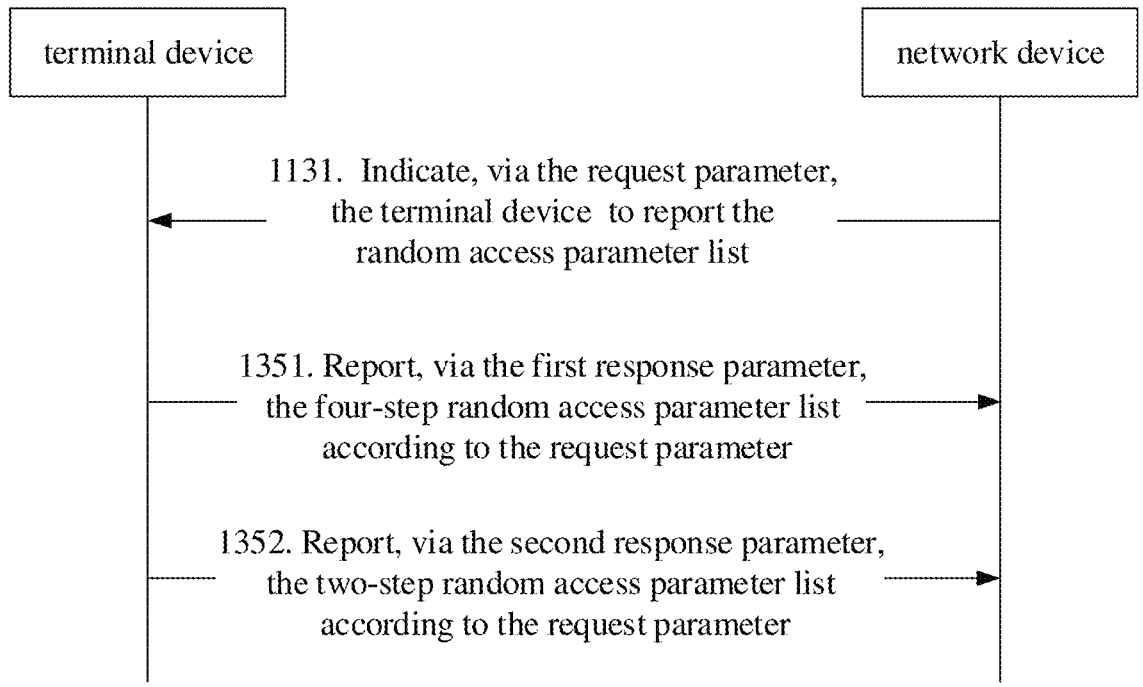
FIG. 7 is an interaction diagram of a method for reporting a random access procedure according to an example embodiment 1 of the present disclosure.

Method 3:

FIG. 7 is an interaction diagram of a method for reporting a random access procedure according to an example embodiment 1 of the present disclosure. Optionally, the first message includes a request parameter.

In step 1131, the network device indicates, via the request parameter, the terminal device to report the random access parameter list. The random access parameter list includes a two-step random access parameter list and/or a four-step random access parameter list. Correspondingly, the terminal device sends a first response parameter and a second response parameter.

Step 130 may include the following steps:

In step 1351, the terminal device reports via the first response parameter the four-step random access parameter list to the network device according to the request parameter; and/or, In step 1352, the terminal device reports via the second response parameter the two-step random access parameter list to the network device according to the request parameter.

When the request parameter configuration is true, if there is a reportable four-step random access parameter list at the terminal device side, the four-step random access parameter list is reported to the network device via the first response parameter in the UEInformationResponse; otherwise, the terminal device does not respond. If there is a reportable two-step random access parameter list at the terminal device side, the reportable two-step random access parameter list is reported to the network device via the second response parameter in the UEInformationResponse; otherwise, the terminal device does not respond.

In the above-mentioned example implementations of requesting the terminal device to report all the random access parameter lists that can be reported without distinguishing the types, after receiving the request from the network device side, the terminal device reports all the random access parameter lists, so the network device does not need to obtain in advance the type of random access parameter list at the terminal device side.

When the first message requests the terminal device to report all the random access parameter lists that can be reported without distinguishing types, as shown in the above embodiments, the terminal device reports the two-step random access parameter list and the four-step random access parameter list respectively, or report the two-step random access parameter list and the four-step random access parameter list together, depending on the storage method of the two-step random access parameter list and the four-step random access parameter list. For example, when the two-step random access parameter list and the four-step random access parameter list are stored in different list entries, they are respectively reported by different response parameters. If the two-step random access parameter list and the four-step random access parameter list are stored in the same list entry, they are reported together with a response parameter. The storage methods of the two-step random access parameter list and the four-step random access parameter list will be described in detail in the following contents.

Optionally, the random access resource parameters include:

a frequency domain starting point of a random access occasion resource for two-step random access; and/or, the number of multiplexed random access occasion resources for two-step random access in a frequency domain; and/or, subcarrier spacing corresponding to a random access occasion resource for two-step random access; and/or, a frequency domain starting point of a physical uplink shared channel resource; and/or, the number of multiplexed physical uplink shared channel resources in a frequency domain; and/or, the number of physical resource blocks occupied by each physical uplink shared channel resource unit in a frequency domain; and/or, a guard period for a physical uplink shared channel resource unit in a frequency domain.

The two-step random access includes a PRACH resource for preamble transmission and a PUSCH resource for payload transmission. In order to optimize the resource configuration of the two-step random access on each BWP (Bandwidth Part), the network device needs the corresponding physical resource configuration during the access procedure of the terminal device, so as to make corresponding adjustments according to the access performance. Therefore, the terminal device needs to report the random access resource parameter used in two-step random access procedure each time.

Figure 8:
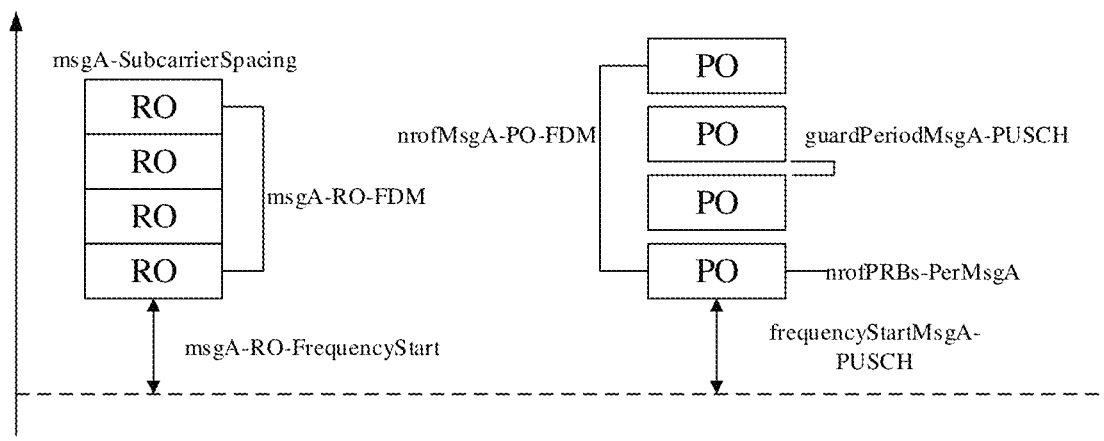
FIG. 8 is a schematic diagram of random access resource parameters.

FIG. 8 is a schematic diagram of random access resource parameters. As shown in FIG. 8, the random access resource parameters may include the following parameters:

a frequency domain starting point (msgA-RO-FrequencyStart) of a random access occasion resource for two-step random access. The RACH Occasion (RO) resources used for contention-based random access and non-contention-based random access may be different in the frequency domain, and/or the configurations at different time points can also be different. The network device can trace, via msgA-RO-FrequencyStart, the frequency domain location where the random access occurs, and optimizes the resource configuration based on access situations under different PRACH configurations;

the number (msgA-RO-FDM) of multiplexed random access occasion resources in the frequency domain for two-step random access. If the number of RO resources configured is small, the collision probability may increase;

subcarrier spacing (msgA-SubcarrierSpacing) corresponding to the random access occasion resource for the two-step random access. This parameter together with msgA-RO-FrequencyStart and msgA-RO-FDM determine the frequency domain range occupied by the PRACH resource;

a frequency domain starting point of the physical uplink shared channel resource (frequencyStartMsgA-PUSCH). Different preamble groups correspond to different PUSCH configurations, and different PUSCH configurations correspond to different frequencyStartMsgA-PUSCH. The network device can determine different PUSCH configurations through frequencyStartMsgA-PUSCH, and optimize the resource configuration according to the access situations under different PUSCH configurations;

the number of physical uplink shared channel resources multiplexed in the frequency domain (nrofMsgA-PO-FDM). If the number of PUSCH resource units configured is small, multiple preambles may be associated with one PUSCH resource unit. When multiple terminal devices send MsgA payload on the same time-frequency resource, there will be interference with each other, which may affect successful detection/decoding of the PUSCH of the network and trigger the fallback procedure. The network can adjust nfMsgA-PO-FDM to reduce the probability of terminal fallback, and PO is the physical uplink shared channel resource occasion (PUSCH Occasion);

the number of physical resource blocks (nrofPRBs-PerMsgA) occupied by each physical uplink shared channel resource unit in the frequency domain. The number of PRBs (Physical Resource Blocks) affects the amount of data that can be transmitted by the terminal device. For a certain MCS (Modulation and Coding Scheme), the larger the PRB, the larger the amount of data that the terminal device can transmit. When preambles are grouped, preamble group B usually corresponds to a larger PRB. The network device can determine different preamble groups through nrofPRBs-PerMsgA, and optimize grouping standards, resource configuration, power control parameters, etc. in combination with the access situations under different preamble groups;

a guard period (guardPeriodMsgA-PUSCH) of the physical uplink shared channel resource unit in the frequency domain. If the guardPeriodMsgA-PUSCH is set too small, the use of two adjacent PUSCH resources in the frequency domain for data transmission may cause mutual interference. As a result, the network device cannot successfully detect/decode the PUSCH and trigger the fallback procedure. The network device can configure guardPeriodMsgA-PUSCH to reduce the probability of fallback at the terminal device.

The msgA-RO-FrequencyStart, msgA-RO-FDM and msgA-SubcarrierSpacing are used to reflect the frequency domain information of PRACH resources. The three can be used to jointly determine the starting position, number and occupied bandwidth of PRACH on BWP. The frequencyStartMsgA-PUSCH, nrofMsgA-PO-FDM, nrofPRBs-PerMsgA, and guardPeriodMsgA-PUSCH are used to reflect the frequency domain information of PUSCH resources, and the four can be used to jointly determine the starting position, number and occupied bandwidth of PUSCH resources on the BWP.

Optionally, the contention detection and fallback indication parameter include:

a contention detection indication, used to indicate whether the terminal device detects a contention resolution failure; and/or, a fallback indication, used to indicate whether the terminal device receives a fallback random access response sent by the network device.

For each two-step random access attempt, after MsgA is sent, there may be following situations for the reception at the terminal device side:

1. Within the receiving window, no response is received from the network device side.

2. Within the receiving window, a fallbackRAR sent by the network device is received, and the terminal device falls back to the transmission of Msg3.

2.1. After Msg3 is transmitted, no response from the network device side is received within the receiving window.

2.2. After Msg3 is transmitted, Msg4 is received within the receiving window, and the contention resolution is determined to fail according to CRID.

2.3. After Msg3 is transmitted, Msg4 is received within the receiving window, and the contention resolution is determined to succeed according to CRID.

3. Within the receiving window, a successRAR (successful random access response) sent by the network device is received, and the contention resolution is determined to succeed according to CRID.

4. Within the receiving window, a successRAR sent by the network device side is received, and the contention resolution is determined to fail according to CRID.

The contention detection indication and the fallback indication are configured. The contention detection indication is used to indicate whether the terminal device can detect that the contention resolution fails after the MsgA and/or Msg3 are sent. The fallback indication is used to indicate whether the terminal device has received the fallbackRAR sent by the network device.

For situations 1 and 3 above: the contention detection indication is set to 'false (no)' and the fallback indication is set to 'false';

for situation 4 above: the contention detection indication is set to 'true' and the fallback indication is set to 'false';

for the above situations 2.1 and 2.3: the contention detection indication is set to 'false', and the fallback indication is set to 'true';

for situation 2.2 above: the contention detection indication is set to 'true'; the fallback indication is set to 'true'.

Optionally, the contention detection indication includes:

a first contention detection indication, used to indicate whether the terminal device detects a contention resolution failure in the two-step random access procedure; and/or, a second contention detection indication, used to indicate whether the terminal device detects a contention resolution failure in a four-step random access procedure when a fallback occurs.

It is possible that only the contention detection indication is configured. The contention detection indication may include the first detection indication and the second detection indication. The first detection indication is used to indicate whether a contention resolution failure is detected in the MsgB in the two-step random access procedure. The second contention detection indication is used to indicate whether a contention resolution failure is detected in Msg4 when a fallback occurs, and the second contention detection indication can be used to implicitly indicate that a fallback procedure has occurred to the terminal device.

For the above situations 1 and 3: the first contention detection indication is set to 'false';

for the above situation 4: the first contention detection indication is set to 'true';

for the above situations 2.1 and 2.3: the second contention detection indication is set to 'false';

for the above situation 2.2: the second contention detection indication is set to 'true'.

In the two-step random access procedure, when the network device only detects the MsgA preamble but fails to detect/decode the MsgA payload, the terminal device will receive the fallbackRAR and transmit Msg3 according to the indication in the fallbackRAR. The reasons why the payload is not successfully detected/decoded may be as follows:

Interference. For example, when multiple preambles correspond to one PUSCH resource unit, the network device receives payloads sent by multiple terminal devices on the same time-frequency resource, which constitutes interference with each other; or, the interval between two adjacent PUSCH resource units in the frequency domain is set small, resulting in interference between different PUSCH resource units;

The transmit power cannot reach an appropriate power level. For example, if the configuration of power control parameter is unreasonable, or the threshold setting for access type selection is unreasonable, the terminal device with poor channel status chooses two-step random access, resulting in that the transmit power for transmitting MsgA payload does not reach an appropriate power level.

PUSCH resource link performance for two-step random access is poor.

The terminal device feeds back the fallback situation in the two-step random access procedure to the network device, and the network device determines the reason for the terminal device fallback in combination with the resource configuration, the number of attempts and so on, and then optimizes the PRACH and PUSCH resource configuration and adjusts power control parameters in combination with PUSCH resource information.

In an example implementation, the network device can optimize the number of PUSCH resource configurations through nrofMsgA-PO-FDM and a fallback indication. For example, in a certain PUSCH configuration, nrofMsgA-PO-FDM is set to 2, and a total of N users initiate random access in this configuration and the access succeeds finally. According to the random access parameters reported by N terminal devices, the network device finds that 80% of the terminal devices have undergone a fallback procedure before the access is successful, and the number of PUSCH resources multiplexed in the frequency domain is small. Based on this, the network device can determine that the reason why the terminal device has a high fallback probability may be due to less PUSCH resource configuration which results in multiple preambles associated with one PUSCH resource unit. When multiple terminal devices send MsgA payloads on the same time-frequency resource, there will be interference between each other, affecting the successful detection/decoding of PUSCH by the network device, and triggering the fallback procedure. Therefore, the network device can adjust the nrofMsgA-PO-FDM, such as increasing it to 6, to reduce the probability of fallback of the terminal device.

In an example implementation, the network device may further optimize the grouping threshold through frequencyStartMsgA-PUSCH and nrofPRBs-PerMsgA and the fallback indication. For example, the network device configures different preamble groups for the terminal device. Preamble groupA corresponds to PUSCH configuration #1, the frequency starting point is frequencyStartMsgA-PUSCH #1, and nrofPRBs-PerMsgA is 8; preamble groupB corresponds to PUSCH configuration #2, the frequency starting point is frequencyStartMsgA-PUSCH #2, and nrofPRBs-PerMsgA is 16. The data volume threshold ra-MsgASizeGroupA used to select the preamble group A is 48 bits.

A total of N terminal devices select groupA or groupB and the corresponding PUSCH resources to initiate two-step random access according to the relationship between the size of the MsgA payload to be transmitted and the data volume threshold, and the access is finally successful. According to the random access parameters reported by N terminal devices, the network device finds that 80% of the terminal devices that initiate random access on the PUSCH resources corresponding to groupA are notified by the network to fall back, while only 30% of terminal devices that initiate random access on the PUSCH resources corresponding to groupB are notified by the network to fall back. Based on this, the network device determines that the number of terminal devices belonging to group A is too large, and then adjusts the data volume threshold ra-MsgASizeGroupA used for preamble group A selection to be smaller, for example, to 40 bits to balance the user data under the two preamble groups and reduce the occurrence probability of fallback.

In an example implementation, the network device may further optimize the frequency domain interval of PUSCH resources through guardPeriodMsgA-PUSCH and the fallback indication. For example, in a certain PUSCH configuration, guardPeriodMsgA-PUSCH is 0, and a total of N users initiate random access in this configuration and the access succeeds finally. According to the random access parameters reported by N terminal devices, the network device found that 80% of the terminal devices had a fallback procedure before the access was successful, and guardPeriodMsgA-PUSCH was set to 0. Based on this, the network device can determine that the reason why the terminal devices have a high fallback probability may be due to the interference between adjacent PUSCH resources in the frequency domain which affects the successful detection/decoding of the PUSCH by the network and triggers the fallback procedure. Therefore, the network device can reduce the occurrence probability of fallback of the terminal devices by setting guardPeriodMsgA-PUSCH.

Figure 9:
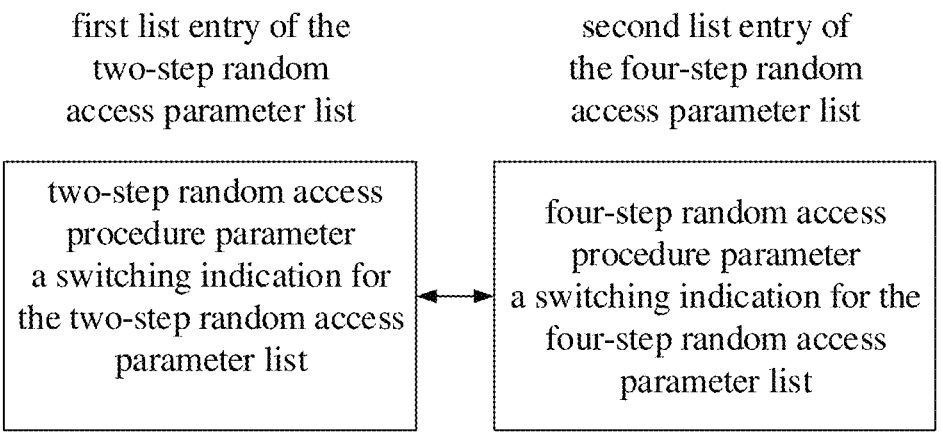
FIG. 9 is a schematic diagram of a random access parameter list.

Optionally, in an example embodiment of the present disclosure, when random access type switching occurs in the random access procedure of the terminal device, the random access parameter list stored by the terminal device and whether there is a random access type switching parameter may include the following situations:

Situation 1:

FIG. 9 is a schematic diagram of a random access parameter list. As shown in FIG. 9, optionally, when there exists random access type switching, and different random access procedure parameters are respectively stored in the list entries of different random access parameter lists, for example, the two-step random access procedure parameters are stored as the first list entry in the two-step random access parameter list and the four-step random access procedure parameters are stored as the second list entry in the four-step random access parameter list, the random access switching type parameters include:

a switching indication for the two-step random access parameter list, which is stored in the first list entry and used to indicate an index of the second list entry; and/or, a switching indication for the four-step random access parameter list, which is stored in the second list entry and used to indicate an index of the first list entry.

The random access type switching parameter includes: the switching indication for the two-step random access parameter list and the switching indication for the four-step random access parameter list.

The switching indication can be set as the indexes of the first list entry and the second list entry. The first list entry of the two-step random access parameter list stores the two-step random access procedure parameters. When access type switching occurs in the two-step random access, the four-step random access procedure parameters after switching are stored in the second list entry of the four-step random access parameter list, and the switching indication of the two-step random access parameter list in the first list entry is set to the index of the second list entry; the switching indication of the four-step random access parameter list in the second list entry is set as the index of the first list entry. Therefore, the list entries before and after the switching are associated, which can assist the network to understand the complete random access procedure. The two-step random access procedure parameters may include resource information, type information, beam information, contention resolution information of two-step random access, and four-step random access procedure parameters may include resource information, type information, beam information, contention resolution information of four-step random access.

In an example implementation, the two-step random access procedure parameters and the four-step random access procedure parameters are stored separately, and thus the uniformity of the types in each list can be maintained.

Figure 10:
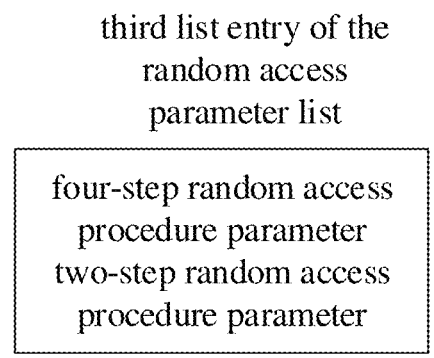
FIG. 10 is a schematic diagram of a random access parameter list.

Situation 2:

FIG. 10 is a schematic diagram of a random access parameter list. As shown in FIG. 10, optionally, when there exists random access type switching, different random access procedure parameters are stored as the same list entry in the same list entry of the two-step random access parameter list or the four-step random access parameter. For example, both the two-step random access procedure parameters and the four-step random access procedure parameters are stored in the random access parameter list as the third list entry.

When there exists random access type switching, both the successfully completed two-step random access procedure parameters and four-step random access procedure parameters are stored in the random access parameter list as the third list entry, including the two-step random access parameter list or the four-step random access parameter list. The two-step random access procedure parameters and four-step random access procedure parameters are stored in temporal order, that is, the third list entry includes both the two-step random access procedure parameters and the four-step random access procedure parameters.

In this example embodiment, the two-step random access procedure parameters and the four-step random access procedure parameters are stored as a single access procedure in the random access parameter list as a whole, and type information needs to be introduced to distinguish two different access types in the same list entry.

Optionally, the first list entry and/or the third list entry includes: reference signal received power for downlink path loss reference.

The reference signal received power for downlink path loss reference is used to indicate a threshold for optimizing random access type selection.

The reasons for the terminal to switch the access type may be as follows:

Serious competition exists when two-step random switching attempts are made. For example, there are few two-step random switching resources, or the threshold setting used for access type selection is unreasonable, resulting in more users choosing two-step random access.

The transmit power cannot reach an appropriate power level. For example, the threshold setting for the access type selection is unreasonable, and thus terminal devices with poor channel status choose two-step random access, or the power control parameter configuration is unreasonable, which causes that the power of the terminal device cannot climb to a proper power level within the maximum number of attempts for two-step random access.

Resource wireless link performance for two-step random access is poor.

The terminal device records and reports the type switching that occurs during the two-step random access procedure and the specific access information under the corresponding type, which can assist the network device to infer the cause of access problem in the two-step random access in the terminal device, and then optimize the resource configuration, the threshold for selecting the access type and the power control parameter for the two-step random access.

In an example implementation, the network optimizes the access type selection threshold by using RSRP (Reference Signal Receiving Power) for downlink pathloss reference and a switching indication. For example: assuming that the threshold for random access type selection is −60 dBm, if the RSRP used by the terminal device for the downlink pathloss reference is greater than −60 dBm, two-step random access is selected, and otherwise, four-step random access is selected. According to the random access parameter lists reported by the terminal devices, the network device finds that half of the users who have selected two-step random access have switched the random access type, and the RSRP for downlink pathloss reference reported by the users who have switched access type is relatively low. Based on this, the network device determines that the users with poor channel status select two-step random access because the access type selection threshold is set low, and then the network device can increase the threshold for random access type selection, for example, to −40 dBm, so as to ensure that users with better channel status choose two-step random access to reduce the occurrence probability of switching.

In the embodiment 1, the first message sent by the network device is received. The first message is used to indicate the terminal device to report the random access parameter list to the network device. The random access parameter list includes a two-step random access parameter list and/or a four-step random access parameter list. The random access parameter list is reported to the network device according to the first message. Therefore, the terminal device can report the random access parameter list to the network device, ensuring that the network device can obtain the two-step random access parameter list, and further, according to the relevant parameters for the two-step random access procedure, the parameter configuration for the two-step random access procedure can be adaptively optimized, thereby solving the technical problem that the optimization for parameter configuration of the two-step random access procedure is poor.

Figure 11:
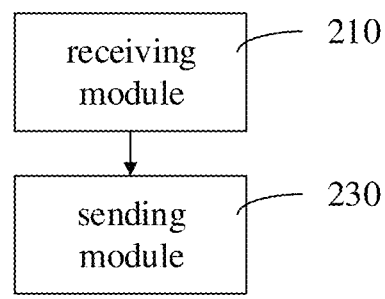
FIG. 11 is a block diagram of a device for reporting a random access procedure according to an example embodiment 2 of the present disclosure.

FIG. 11 is a block diagram of a device for reporting a random access procedure according to an example embodiment 2 of the present disclosure. As shown in FIG. 11, the device is a terminal device. The device may include but not limited to: a receiving module 210 and a sending module 230.

The receiving module 210 is configured to receive a first message sent by a network device, wherein the first message is used to indicate the terminal device to report a random access parameter list to the network device, and the random access parameter list includes a two-step random access parameter list and/or a four-step random access parameter list.

The sending module 230 is configured to report the random access parameter list to the network device according to the first message.

According to some embodiments, the random access parameter list includes a random access procedure parameter for at least one successfully completed random access procedure, and the random access procedure parameter includes:

a random access resource parameter, and/or a collision detection and fallback indication parameter, and/or a random access type switching parameter.

According to some embodiments, the first message includes: a first request parameter and/or a second request parameter;

wherein the first request parameter is used to indicate the terminal device to report the four-step random access parameter list, and the second request parameter is used to indicate the terminal device to report the two-step random access parameter list;

wherein the sending module 230 is further configured to:

according to the first request parameter, report the four-step random access parameter list to the network device via a first response parameter; and/or, according to the second request parameter, report the two-step random access parameter list to the network device via a second response parameter.

According to some embodiments, the first message includes a request parameter, and the request parameter is used to indicate the terminal device to report the two-step random access parameter list and/or the four-step random access parameter list.

According to some embodiments, the sending module 230 is further configured to:

according to the request parameter, report the random access parameter list via a response parameter.

According to some embodiments, the sending module 230 is further configured to:

according to the request parameter, report the four-step random access parameter list to the network device via a first sub-response parameter of a response parameter; and/or, according to the request parameter, report the two-step random access parameter list to the network device via a second sub-response parameter of the response parameter.

According to some embodiments, the sending module 230 is further configured to:

according to the request parameter, report the four-step random access parameter list to the network device via a first response parameter; and/or, according to the request parameter, report the two-step random access parameter list to the network device via a second response parameter.

According to some embodiments, the request parameter includes a first sub-request parameter and a second sub-request parameter, the first sub-request parameter is used to indicate the terminal device to report the four-step random access parameter list, and the second sub-request parameter is used to indicate the terminal device to report the two-step random access parameter list;

wherein the sending module 230 is further configured to:

according to the first sub-request parameter, report the four-step random access parameter list to the network device via a first sub-response parameter of a response parameter; and/or, according to the second sub-request parameter, report the two-step random access parameter list to the network device via a second sub-response parameter of the response parameter.

According to some embodiments, the random access resource parameter includes:

a frequency domain starting point of a random access occasion resource for two-step random access; and/or, the number of multiplexed random access occasion resources for two-step random access in a frequency domain; and/or, subcarrier spacing corresponding to a random access occasion resource for two-step random access; and/or, a frequency domain starting point of a physical uplink shared channel resource; and/or, the number of multiplexed physical uplink shared channel resources in a frequency domain; and/or, the number of physical resource blocks occupied by each physical uplink shared channel resource unit in a frequency domain; and/or, a guard period for a physical uplink shared channel resource unit in a frequency domain.

According to some embodiments, the contention detection and fallback indication parameter include:

a contention detection indication used to indicate whether the terminal device detects a contention resolution failure; and/or a fallback indication used to indicate whether the terminal device receives a fallback random access response sent by the network device.

According to some embodiments, the contention detection indication includes:

a first contention detection indication used to indicate whether the terminal device detects a contention resolution failure in a two-step random access procedure; and/or, a second contention detection indication used to indicate whether the terminal device detects a contention resolution failure in a four-step random access procedure when a fallback occurs.

According to some embodiments, when random access type switching exists, a two-step random access procedure parameter is stored as a first list entry in the two-step random access parameter list, and a four-step random access procedure parameter is stored as a second list entry in the four-step random access parameter list, the random access type switching parameter includes:

a switching indication for the two-step random access parameter list, which is stored in the first list entry and used to indicate an index of the second list entry; and/or, a switching indication for the four-step random access parameter list, which is stored in the second list entry and used to indicate an index of the first list entry.

According to some embodiments, when random access type switching exists, both a two-step random access procedure parameter and a four-step random access procedure parameter are stored in the random access parameter list as a third list entry.

According to some embodiments, the first list entry and/or the third list entry includes: a reference signal received power for a downlink pathloss reference.

For the implementations of the functions and roles of each module in the device embodiments and other parts that are not described or defined in detail, please refer to the description in example embodiment 1 above for details, and repeated descriptions will be omitted here.

Figure 12:
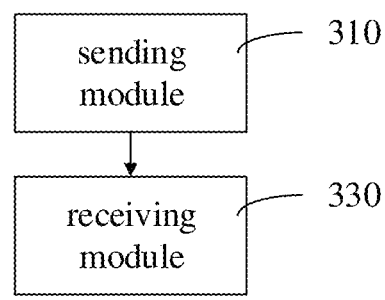
FIG. 12 is a block diagram of a device for reporting a random access procedure according to an example embodiment 3 of the present disclosure.

FIG. 12 is a block diagram of a device for reporting a random access procedure according to an example embodiment 3 of the present disclosure. As shown in FIG. 12, the device may be a network device. The device may include but not limited to a sending module 310 and a receiving module 330.

The sending module 310 is configured to send a first message to a terminal device, wherein the first message is used to indicate the terminal device to report a random access parameter list to the network device, and the random access parameter list includes a two-step random access parameter list and/or a four-step random access parameter list.

The receiving module 330 is configured to receive the random access parameter list which is reported by the terminal device according to the first message.

According to some embodiments, the random access parameter list includes a random access procedure parameter for at least one successfully completed random access procedure, and the random access procedure parameter includes:

a random access resource parameter, and/or a collision detection and fallback indication parameter, and/or a random access type switching parameter.

According to some embodiments, the first message includes: a first request parameter and/or a second request parameter;

wherein the first request parameter is used to indicate the terminal device to report the four-step random access parameter list, and the second request parameter is used to indicate the terminal device to report the two-step random access parameter list;

wherein the receiving module 330 is further configured to:

receive the four-step random access parameter list which is reported by the terminal device via a first response parameter according to the first request parameter; and/or, receive the two-step random access parameter list which is reported by the terminal device via a second response parameter according to the second request parameter.

According to some embodiments, the first message includes a request parameter, and the request parameter is used to indicate the terminal device to report the two-step random access parameter list and/or the four-step random access parameter list.

According to some embodiments, the receiving module 330 is further configured to:

receive the random access parameter list which is reported by the terminal device via a response parameter according to the request parameter.

According to some embodiments, the receiving module 330 is further configured to:

receive the four-step random access parameter list which is reported by the terminal device via a first sub-response parameter of a response parameter according to the request parameter; and/or, receive the two-step random access parameter which is reported by the terminal device via a second sub-response parameter of the response parameter according to the request parameter.

According to some embodiments, the receiving module 330 is further configured to:

receive the four-step random access parameter list which is reported by the terminal device via a first response parameter according to the request parameter; and/or, receive the two-step random access parameter list which is reported by the terminal device via a second response parameter according to the request parameter.

According to some embodiments, the request parameter includes a first sub-request parameter and a second sub-request parameter, the first sub-request parameter is used to indicate the terminal device to report the four-step random access parameter list, and the second sub-request parameter is used to indicate the terminal device to report the two-step random access parameter list;

wherein the receiving module 330 is further configured to:

receive the four-step random access parameter list which is reported by the terminal device via a first sub-response parameter of a response parameter according to the first sub-request parameter; and/or, receive the two-step random access parameter list which is reported by the terminal device via a second sub-response parameter of the response parameter according to the second sub-request parameter.

According to some embodiments, the random access resource parameter includes:

a frequency domain starting point of a random access occasion resource for two-step random access; and/or, the number of multiplexed random access occasion resources for two-step random access in a frequency domain; and/or, subcarrier spacing corresponding to a random access occasion resource for two-step random access; and/or, a frequency domain starting point of a physical uplink shared channel resource; and/or, the number of multiplexed physical uplink shared channel resources in a frequency domain; and/or, the number of physical resource blocks occupied by each physical uplink shared channel resource unit in a frequency domain; and/or, a guard period for a physical uplink shared channel resource unit in a frequency domain.

According to some embodiments, the contention detection and fallback indication parameter include:

a contention detection indication used to indicate whether the terminal device detects a contention resolution failure; and/or a fallback indication used to indicate whether the terminal device receives a fallback random access response sent by the network device.

According to some embodiments, the contention detection indication includes:

a first contention detection indication used to indicate whether the terminal device detects a contention resolution failure in a two-step random access procedure; and/or, a second contention detection indication used to indicate whether the terminal device detects a contention resolution failure in a four-step random access procedure when a fallback occurs.

According to some embodiments, when random access type switching exists, a two-step random access procedure parameter is stored as a first list entry in the two-step random access parameter list, and a four-step random access procedure parameter is stored as a second list entry in the four-step random access parameter list, the random access type switching parameter includes:

a switching indication for the two-step random access parameter list, which is stored in the first list entry and used to indicate an index of the second list entry; and/or, a switching indication for the four-step random access parameter list, which is stored in the second list entry and used to indicate an index of the first list entry.

According to some embodiments, when random access type switching exists, both a two-step random access procedure parameter and a four-step random access procedure parameter are stored in the random access parameter list as a third list entry.

According to some embodiments, the first list entry and/or the third list entry includes: a reference signal received power for a downlink pathloss reference.

For the implementations of the functions and roles of each module in the device embodiments and other parts that are not described or defined in detail, please refer to the description in example embodiment 1 and embodiment 2 above for details, and repeated descriptions will be omitted here.

Figure 13:
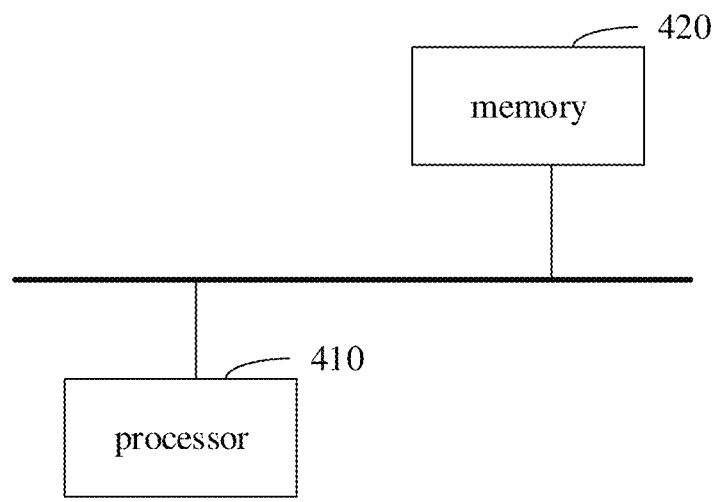
FIG. 13 is a schematic diagram of the hardware structure of a device for reporting a random access procedure according to an example embodiment 4 of the present disclosure.

FIG. 13 is a schematic diagram of the hardware structure of a device for reporting a random access procedure according to an example embodiment 4 of the present disclosure. As shown in FIG. 13, the device includes: a processor 410 and a memory 420, and the above components of the device are connected to each other through a bus system for communication.

The memory 420 stores a program that can be run on the processor 410. When the processor 410 executes the program, it implements some or all of the steps of the method for reporting the random access procedure in the embodiment 1 of the above method.

The processor 410 may be an independent component, or may be a collective term for multiple processing components. For example, it may be a CPU, an ASIC, or one or more integrated circuits configured to implement the above method embodiments, such as at least one microprocessor DSP, or at least one programmable gate FPGA, etc.

The steps of the methods or algorithms described in the example embodiments of the present application may be implemented in a hardware, or may be implemented in a manner of a processor executing software instructions. Software instructions can be composed of corresponding software modules, and software modules can be stored in Random Access Memory (RAM), flash memory, Read Only Memory (ROM), Erasable Programmable ROM (EPROM), Electrically EPROM (EEPROM), registers, hard disks, removable hard disks, read-only optical disks (CD-ROMs), or any other form of storage medium known in the art. An exemplary storage medium is coupled to the processor, such that the processor can read information from, and write information to, the storage medium. According to some embodiments, the storage medium can also be an integral part of the processor. The processor and storage medium may reside in an ASIC. Additionally, the ASIC may reside in access network device, a target network device or a core network device. According to some embodiments, the processor and the storage medium may also exist in the access network device, the target network device or the core network device as discrete components.

Those skilled in the art should realize that, in one or more of the above examples, the functions described in the example embodiments of the present disclosure may be implemented in whole or in part by software, hardware, firmware or any combination thereof. When implemented in software, the functions can be implemented in whole or in part in the form of a computer program product. The computer program product includes one or more computer instructions. When the computer program instructions are loaded and executed on a computer, all or part of the processes or functions described in the example embodiments of the present disclosure are produced. The computer may be a general purpose computer, a special purpose computer, a computer network, or other programmable device. The computer instructions may be stored in the computer-readable storage medium or transmitted from one computer-readable storage medium to another computer-readable storage medium, for example, the computer instructions may be downloaded from a website, computer, server, or data center to another website, computer, server, or data center in a wired manner (e.g., coaxial cable, optical fiber, Digital Subscriber Line (DSL)) or in a wireless manner (e.g., infrared, wireless, microwave, etc.). The computer-readable storage medium may be any available medium that can be accessed by a computer or a data storage device such as a server, data center, etc. that includes an integration of one or more available medium. The available medium may be magnetic medium (e.g., floppy disks, hard disks, magnetic tapes), optical medium (e.g., Digital Video Disc (DVD)), or semiconductor medium (e.g., Solid State Disk (SSD)), and so on.

The purposes, technical solutions and beneficial effects of the example embodiments of the present disclosure are described above in detail using the example implementations. It should be understood that the above descriptions are only example implementations of the present disclosure, and are not intended to limit the protection scope of the embodiments of the present disclosure. Any modification, equivalent replacement, improvement, etc. made on the basis of the technical solutions of the example embodiments of the present disclosure should fall within protection scope of the embodiments of the present disclosure.

It should be understood that the present disclosure is not limited to the precise structures described above and illustrated in the accompanying drawings, and that various modifications and changes may be made without departing from the scope of the present disclosure. The scope of the present disclosure is defined only by the appended claims.

What is claimed is:

1. A method for reporting a random access procedure, applied in a terminal device, wherein the method comprises:
receiving a first message sent by a network device, wherein the first message is used to indicate the terminal device to report a random access parameter list to the network device, and the random access parameter list comprises a two-step random access parameter list or comprises the two-step random access parameter list and a four-step random access parameter list; and
reporting the random access parameter list to the network device according to the first message;
wherein the random access parameter list comprises a random access procedure parameter for at least one successfully completed random access procedure, and the random access procedure parameter comprises: a random access resource parameter;
wherein the random access resource parameter comprises:
a frequency domain starting point of a physical uplink shared channel resource;
a number of multiplexed physical uplink shared channel resources in a frequency domain; and
a number of physical resource blocks occupied by each physical uplink shared channel resource unit in the frequency domain.

2. The method according to claim 1, wherein the random access procedure parameter further comprises at least one of:
a contention detection and fallback indication parameter, or a random access type switching parameter.

3. The method according to claim 1, wherein the first message comprises: a second request parameter, or the first message comprises the second request parameter and a first request parameter;
wherein the first request parameter is used to indicate the terminal device to report the four-step random access parameter list, and the second request parameter is used to indicate the terminal device to report the two-step random access parameter list;
wherein reporting the random access parameter list to the network device according to the first message comprises:
according to the second request parameter, reporting the two-step random access parameter list to the network device via a second response parameter;
or, wherein reporting the random access parameter list to the network device according to the first message comprises:
according to the first request parameter, reporting the four-step random access parameter list to the network device via a first response parameter; and
according to the second request parameter, reporting the two-step random access parameter list to the network device via the second response parameter.

4. The method according to claim 1, wherein the first message comprises a request parameter, and the request parameter is used to indicate the terminal device to report the two-step random access parameter list or to indicate the terminal device to report the two-step random access parameter list and the four-step random access parameter list.

5. The method according to claim 4, wherein reporting the random access parameter list to the network device according to the first message comprises:
according to the request parameter, reporting the two-step random access parameter list to the network device via a second sub-response parameter of the response parameter;
or, wherein reporting the random access parameter list to the network device according to the first message comprises:
according to the request parameter, reporting the four-step random access parameter list to the network device via a first sub-response parameter of the response parameter; and
according to the request parameter, reporting the two-step random access parameter list to the network device via the second sub-response parameter of the response parameter.

6. The method according to claim 2, wherein the random access resource parameter further comprises at least one of:
a frequency domain starting point of a random access occasion resource for two-step random access;
a number of multiplexed random access occasion resources for two-step random access in a frequency domain;
subcarrier spacing corresponding to a random access occasion resource for two-step random access;
a guard period for a physical uplink shared channel resource unit in the frequency domain.

7. The method according to claim 2, wherein the contention detection and fallback indication parameter comprise at least one of:
a contention detection indication used to indicate whether the terminal device detects a contention resolution failure; or
a fallback indication used to indicate whether the terminal device receives a fallback random access response sent by the network device.

8. The method according to claim 2, wherein in response to random access type switching existing, a two-step random access procedure parameter is stored as a first list entry in the two-step random access parameter list, and a four-step random access procedure parameter is stored as a second list entry in the four-step random access parameter list, the random access type switching parameter comprises at least one of:
a switching indication for the two-step random access parameter list, which is stored in the first list entry and used to indicate an index of the second list entry; or
a switching indication for the four-step random access parameter list, which is stored in the second list entry and used to indicate an index of the first list entry.

9. The method according to claim 2, wherein in response to random access type switching existing, both a two-step random access procedure parameter and a four-step random access procedure parameter are stored in the random access parameter list as a third list entry.

10. The method according to claim 8, wherein at least one of the first list entry or a third list entry comprises: a reference signal received power for a downlink pathloss reference.

11. A terminal device, comprising one or more processors, and memory storing a plurality of programs that, when executed by the one or more processors, cause the terminal device to:
receive a first message sent by a network device, wherein the first message is used to indicate the terminal device to report a random access parameter list to the network device, and the random access parameter list comprises a two-step random access parameter list or comprises two-step random access parameter list and a four-step random access parameter list; and
report the random access parameter list to the network device according to the first message;
wherein the random access parameter list comprises a random access procedure parameter for at least one successfully completed random access procedure, and the random access procedure parameter comprises: a random access resource parameter;
wherein the random access resource parameter comprises:
a frequency domain starting point of a physical uplink shared channel resource;
a number of multiplexed physical uplink shared channel resources in a frequency domain; and
a number of physical resource blocks occupied by each physical uplink shared channel resource unit in a frequency domain.

12. The terminal device according to claim 11, wherein the random access procedure parameter further comprises at least one of:
 a contention detection and fallback indication parameter, or a random access type switching parameter.

13. The terminal device according to claim 11, wherein the first message comprises: a second request parameter, or the first message comprises the second request parameter and a first request parameter;
 wherein the first request parameter is used to indicate the terminal device to report the four-step random access parameter list, and the second request parameter is used to indicate the terminal device to report the two-step random access parameter list;
 wherein when the plurality of programs are executed by the one or more processors, the terminal device is caused to:
 according to the second request parameter, report the two-step random access parameter list to the network device via a second response parameter; or
 wherein when the plurality of programs are executed by the one or more processors, the terminal device is caused to:
 according to the first request parameter, report the four-step random access parameter list to the network device via a first response parameter; and
 according to the second request parameter, report the two-step random access parameter list to the network device via the second response parameter.

14. The terminal device according to claim 11, wherein the first message comprises a request parameter, and the request parameter is used to indicate the terminal device to report the two-step random access parameter list or to indicate the terminal device to report the two-step random access parameter list and the four-step random access parameter list.

15. The terminal device according to claim 12, wherein the random access resource parameter further comprises at least one of:
 a frequency domain starting point of a random access occasion resource for two-step random access;
 a number of multiplexed random access occasion resources for two-step random access in a frequency domain;
 subcarrier spacing corresponding to a random access occasion resource for two-step random access; or,
 a guard period for a physical uplink shared channel resource unit in the frequency domain.

16. The terminal device according to claim 12, wherein the contention detection and fallback indication parameter comprise at least one of:
 a contention detection indication used to indicate whether the terminal device detects a contention resolution failure; or
 a fallback indication used to indicate whether the terminal device receives a fallback random access response sent by the network device.

17. The terminal device according to claim 12, wherein in response to random access type switching existing, a two-step random access procedure parameter is stored as a first list entry in the two-step random access parameter list, and a four-step random access procedure parameter is stored as a second list entry in the four-step random access parameter list, the random access type switching parameter comprises at least one of:
 a switching indication for the two-step random access parameter list, which is stored in the first list entry and used to indicate an index of the second list entry; or
 a switching indication for the four-step random access parameter list, which is stored in the second list entry and used to indicate an index of the first list entry.

18. The terminal device according to claim 12, wherein in response to random access type switching existing, both a two-step random access procedure parameter and a four-step random access procedure parameter are stored in the random access parameter list as a third list entry.

19. The terminal device according to claim 17, wherein at least one of the first list entry or a third list entry comprises:
 a reference signal received power for a downlink pathloss reference.

20. A network device, comprising one or more processors, and memory storing a plurality of programs that, when executed by the one or more processors, cause a communication mode switching device to:
 send a first message to a terminal device, wherein the first message is used to indicate the terminal device to report a random access parameter list to the network device, and the random access parameter list comprises a two-step random access parameter list or comprises two-step random access parameter list and a four-step random access parameter list; and
 receive the random access parameter list which is reported by the terminal device according to the first message;
 wherein the random access parameter list comprises a random access procedure parameter for at least one successfully completed random access procedure, and the random access procedure parameter comprises: a random access resource parameter;
 wherein the random access resource parameter comprises:
 a frequency domain starting point of a physical uplink shared channel resource;
 a number of multiplexed physical uplink shared channel resources in a frequency domain; and
 a number of physical resource blocks occupied by each physical uplink shared channel resource unit in a frequency domain.

* * * * *